(12) United States Patent
Uyeno et al.

(10) Patent No.: US 11,550,146 B2
(45) Date of Patent: Jan. 10, 2023

(54) SMALL ANGLE OPTICAL BEAM STEERING USING MICRO-ELECTRO-MECHANICAL SYSTEM (MEMS) MICRO-MIRROR ARRAYS (MMAS)

(71) Applicant: Raytheon Company, Waltham, MA (US)

(72) Inventors: Gerald P. Uyeno, Tucson, AZ (US); Mark K. Lange, Tucson, AZ (US); Sean D. Keller, Tucson, AZ (US); Benn H. Gleason, Tucson, AZ (US); Zachary D. Barker, Marana, AZ (US); Craig O. Shott, Benson, AZ (US); Eric Rogala, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 186 days.

(21) Appl. No.: 17/152,023

(22) Filed: Jan. 19, 2021

(65) Prior Publication Data

US 2022/0229285 A1    Jul. 21, 2022

(51) Int. Cl.
*G02B 26/08* (2006.01)

(52) U.S. Cl.
CPC .............................. *G02B 26/0833* (2013.01)

(58) Field of Classification Search
None
See application file for complete search history.

(56) References Cited

U.S. PATENT DOCUMENTS

| | | |
|---|---|---|
| 5,404,375 A | 4/1995 | Kroeger et al. |
| 5,854,702 A | 12/1998 | Ishikawa et al. |
| 6,181,450 B1 | 1/2001 | Dishman et al. |
| 6,271,953 B1 | 8/2001 | Dishman et al. |
| 6,327,063 B1 | 12/2001 | Rockwell |

(Continued)

FOREIGN PATENT DOCUMENTS

| | | |
|---|---|---|
| AU | 2005213216 A1 | 8/2005 |
| AU | 2005213231 A1 | 8/2005 |

(Continued)

OTHER PUBLICATIONS

"U.S. Appl. No. 17/007,917, Supplemental Notice of Allowability dated Apr. 19, 2022", 2 pgs.

(Continued)

*Primary Examiner* — Elmito Breval
(74) *Attorney, Agent, or Firm* — Schwegman Lundberg & Woessner, P.A.

(57) ABSTRACT

Small angle optical beam steering is performed using a Micro-Electro-Mechanical System (MEMS) Micro-Mirror Array (MMA) that minimizes diffraction for a specified steering angle, Generally speaking, this is accomplished with a MEMS MMA that exhibits a "piston" capability to translate individual mirrors in addition to the tip and tilt capabilities. Adjacent mirrors can be tipped/tilted to the specified steering angle and then translated by a requisite amount to approximate a continuous surface. For a specified steering angle, the MEMS MMA is partitioned into one or more sections with each section including the maximum number of mirrors that can be grouped together and actuated to approximate a continuous surface given a maximum translation z. As a result, the only edge discontinuities exist between adjacent sections thereby minimizing distortion for a given steering angle.

20 Claims, 9 Drawing Sheets

(56) References Cited

U.S. PATENT DOCUMENTS

| | | |
|---|---|---|
| 6,567,574 B1 | 5/2003 | Ma et al. |
| 6,792,028 B2 | 9/2004 | Cook et al. |
| 7,304,296 B2 | 12/2007 | Mills et al. |
| 7,593,641 B2 | 9/2009 | Tegge, Jr. |
| 7,626,152 B2 | 12/2009 | King et al. |
| 7,660,235 B2 | 2/2010 | Alicherry et al. |
| 7,667,190 B2 | 2/2010 | Mills et al. |
| 7,969,558 B2 | 6/2011 | Hall |
| 8,164,037 B2 | 4/2012 | Jenkins et al. |
| 8,301,027 B2 | 10/2012 | Shaw et al. |
| 8,305,578 B1 | 11/2012 | Mudge et al. |
| 8,311,372 B2 | 11/2012 | Anderson et al. |
| 8,368,889 B2 | 2/2013 | Schwiegerling et al. |
| 8,380,025 B2 | 2/2013 | Anderson et al. |
| 8,463,080 B1 | 6/2013 | Anderson et al. |
| 8,767,190 B2 | 7/2014 | Hall |
| 8,823,848 B2 | 9/2014 | Chipman et al. |
| 8,983,293 B2 | 3/2015 | Frankel et al. |
| 9,473,768 B2 | 10/2016 | Uyeno et al. |
| 9,477,135 B1 | 10/2016 | Uyeno et al. |
| 9,632,166 B2 | 4/2017 | Trail et al. |
| 9,857,226 B1 | 1/2018 | LeMaster et al. |
| 9,904,081 B2 | 2/2018 | Uyeno et al. |
| 9,927,515 B2 | 3/2018 | Keller et al. |
| 10,148,056 B2 | 12/2018 | Uyeno et al. |
| 10,209,439 B2 | 2/2019 | Keller et al. |
| 10,243,654 B1 | 3/2019 | Uyeno et al. |
| 10,267,915 B2 | 4/2019 | Uyeno et al. |
| 10,381,701 B2 | 8/2019 | Motoi |
| 10,444,492 B2 | 10/2019 | Hopkins et al. |
| 10,718,491 B1 | 7/2020 | Raring et al. |
| 10,969,598 B2 | 4/2021 | Fest et al. |
| 10,998,965 B2 | 5/2021 | Tong et al. |
| 11,042,025 B2 | 6/2021 | Uyeno et al. |
| 11,333,879 B2 | 5/2022 | Uyeno et al. |
| 2002/0141689 A1 | 10/2002 | Qian et al. |
| 2002/0196506 A1 | 12/2002 | Graves et al. |
| 2003/0062468 A1 | 4/2003 | Byren et al. |
| 2003/0081321 A1 | 5/2003 | Moon et al. |
| 2003/0185488 A1 | 10/2003 | Blumenthal |
| 2004/0072540 A1 | 4/2004 | Wilson et al. |
| 2004/0081466 A1 | 4/2004 | Walther et al. |
| 2004/0141752 A1 | 7/2004 | Shelton et al. |
| 2004/0258415 A1 | 12/2004 | Boone et al. |
| 2005/0013003 A1 | 1/2005 | Marom |
| 2005/0031255 A1 | 2/2005 | Schroeder et al. |
| 2005/0100339 A1 | 5/2005 | Tegge |
| 2005/0122566 A1 | 6/2005 | Cicchiello |
| 2005/0288031 A1 | 12/2005 | Davis et al. |
| 2006/0038103 A1 | 2/2006 | Helmbrecht |
| 2007/0031157 A1 | 2/2007 | Yamada et al. |
| 2007/0036480 A1 | 2/2007 | Wu |
| 2008/0050064 A1 | 2/2008 | Sakai et al. |
| 2009/0202254 A1 | 8/2009 | Majumdar et al. |
| 2010/0149533 A1 | 6/2010 | Fest |
| 2010/0166430 A1 | 7/2010 | Alten |
| 2012/0002973 A1 | 1/2012 | Bruzzi et al. |
| 2012/0008133 A1 | 1/2012 | Silny et al. |
| 2012/0114337 A1 | 5/2012 | Aoki |
| 2012/0155885 A1 | 6/2012 | Hannah et al. |
| 2013/0271818 A1 | 10/2013 | Bastien et al. |
| 2014/0063299 A1 | 3/2014 | Fest et al. |
| 2015/0099476 A1 | 4/2015 | Beals |
| 2015/0172218 A1 | 6/2015 | Beshai |
| 2015/0311981 A1 | 10/2015 | Inagaki et al. |
| 2015/0378242 A1 | 12/2015 | Auxier et al. |
| 2016/0003677 A1 | 1/2016 | Pezzaniti et al. |
| 2016/0043800 A1 | 2/2016 | Kingsbury et al. |
| 2016/0234703 A1 | 8/2016 | Aldana et al. |
| 2016/0294472 A1 | 10/2016 | Palmer et al. |
| 2017/0293137 A1 | 10/2017 | Zhao et al. |
| 2018/0231715 A1 | 8/2018 | Bishop et al. |
| 2019/0154921 A1 | 5/2019 | Xing et al. |
| 2020/0244359 A1 | 7/2020 | Csonka et al. |
| 2021/0088776 A1 | 3/2021 | Uyeno et al. |
| 2021/0091854 A1 | 3/2021 | Uyeno et al. |
| 2021/0092260 A1 | 3/2021 | Uyeno et al. |
| 2022/0229160 A1 | 7/2022 | Uyeno et al. |
| 2022/0232144 A1 | 7/2022 | Uyeno et al. |
| 2022/0236383 A1 | 7/2022 | Uyeno et al. |

FOREIGN PATENT DOCUMENTS

| | | |
|---|---|---|
| CN | 1393710 A | 1/2003 |
| CN | 1393711 A | 1/2003 |
| CN | 1393712 A | 1/2003 |
| CN | 1393714 A | 1/2003 |
| CN | 110226103 A | 9/2019 |
| DE | 102011104023.8 B4 | 7/2019 |
| EP | 2667142 A1 | 11/2013 |
| EP | 2533003 B1 | 8/2018 |
| WO | WO-2005125193 A1 | 12/2005 |
| WO | WO-2006042696 A1 | 4/2006 |
| WO | WO-2010032224 A2 | 3/2010 |
| WO | WO-2010049076 A2 | 5/2010 |
| WO | WO-2014145792 A1 | 9/2014 |
| WO | WO-2014200581 A2 | 12/2014 |

OTHER PUBLICATIONS

"U.S. Appl. No. 17/150,286, Notice of Allowance dated Jun. 17, 2022", 10 pgs.

"U.S. Appl. No. 17/150,286, Response filed Apr. 29, 2022 to Non Final Office Action dated Mar. 9, 2022", 12 pgs.

Bishop, Bob, "Northrop Grumman-Developed Beacon Illuminator Laser Proves Reliability in Airborne Laser Ground, Air Tests", Northrop Grumman Corporation, [Online], Retrieved from the Internet: <URL: https://news.northropgrumman.com/news/releases/northrop-grumman-developed-beacon-illuminator-laser-proves-reliability-in-airborne-laser-ground-air-tests?>, (Aug. 13, 2009), 2 pgs.

Kelchner, Bryan, et al., "ABL beam control segment", SPIE, vol. 3381, (Sep. 8, 1998), 6 pgs.

"U.S. Appl. No. 16/871,602, Non Final Office Action dated Nov. 19, 2020", 18 pgs.

"U.S. Appl. No. 16/871,602, Notice of Allowance dated Feb. 24, 2021", 5 pgs.

"U.S. Appl. No. 16/871,602, Response filed Feb. 8, 2021 to Non Final Office Action dated Nov. 9, 2020", 12 pgs.

"U.S. Appl. No. 17/007,917, Non Final Office Action dated Aug. 3, 2021", 35 pgs.

"U.S. Appl. No. 17/007,917, Response filed Dec. 1, 2021 to Non Final Office Action mailed Aug. 3, 2021", 16 pgs.

"High Contrast IR Wire Grid Polarizers", Edmund Optics, [Online]. Retrieved from the Internet: <URL: https://www.edmundoptics.com/f/high-contrast-ir-wire-grid-polarizers/14797/>, (Accessed Sep. 4, 2021), 1 pg.

"Mid-Wave Infrared (MWIR) and Long-Wave Infrared (LWIF) Waveplates", Edmund Optics, [Online]. Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.

"Mirrorcle Technologies MEMS Mirrors—Technical Overview", Mirrorcle Technologies, Inc., (2018), 7 pgs.

Ayral, J.-L., et al., "Phase-conjugate Nd:YAG laser with internal acousto-optic beam steering", Optics Letters, vol. 16, No. 16, (Aug. 15, 1991), 1225-1227.

Chiu, Yi, et al., "Shape-Optimized Electrooptic Beam Scanners: Analysis, Design, and Simulation", Journal of Lightwave Technology, vol. 17, No. 1, (Jan. 1999), 108-114.

Kim, et al., "Demonstration of large-angle nonmechanical laser beam steering based on LC polymer polarization grating", Proc., of SPIE vol. 8052 80520T, (May 13, 2011).

Kim, Jihwan, et al., "Wide-angle, nonmechanical beam steering using thin liquid crystal polarization gratings", Proc. of SPIE, vol. 7093, (2008), 12 pgs.

King, D F, et al., "3rd-Generation 1280 × 720 FPA development status at Raytheon Vision Systems", Proc. of SPIE vol. 6206 62060W-1, (2006), 16 pgs.

(56) References Cited

OTHER PUBLICATIONS

Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 12 pgs.
Salmon, J.T., et al., "An Adaptive Optics System for Solid-State Laser Systems used in Inertial Confinement Fusion", First Annual International Conference on Solid-State Lasers for Application of Intertial Confinement Fusion, Monterey, California, May 30-Jun. 2, 1995, (Sep. 17, 1995), 13 pgs.
Siegman, A. E., "Unstable optical resonators for laser applications", Proceedings of the IEEE, vol. 53, Issue 3, Mar. 2965, 277-287.
Wang, Jinxue, et al., "Doppler Winds Lidar Technology Development and Demonstration", AIAA-2005-6772, Space 2005, Long Beach, California, Aug. 30-1, 2005, 11 pgs.
Yamamoto, R., et al., "Evolution of a Solid State Laser", Proc. SPIE 6552, Laser Source Technology for Defense and Security III, 655205, (May 10, 2007), 11 pgs.
"U.S. Appl. No. 17/007,917, Notice of Allowance dated Jan. 10, 2022", 14 pgs.
"U.S. Appl. No. 17/150,286, Non Final Office Action dated Mar. 9, 2022", 13 pgs.

SMALL ANGLE OPTICAL BEAM STEERING USING MICRO-ELECTRO-MECHANICAL SYSTEM (MEMS) MICRO-MIRROR ARRAYS (MMAS)

BACKGROUND OF THE INVENTION

Field of the Invention

This invention relates to optical beam steering, and more particularly to small angle optical beam steering using Micro-Electro-Mechanical System (MEMS) Micro-Mirror Arrays MMAS).

Description of the Related Art

Active optical systems use laser radiation to illuminate a scene. In various conventional approaches, an illumination source is positioned to continuously illinate an entire scene within a Field of View (FOV). Such illumination sources consume a great deal of power. Other approaches have suggested positioning beamforming optics on a gimbal system, which would allow mechanical movement of the system to scan the scene to reduce power consumption. However, with these typical solutions the cost and weight of the associated system significantly increases while the speed of the system decreases.

Another approach is to use a waveguide such as a liquid crystal waveguide (LCWG) to steer a beam of optical radiation provided by an illumination source. A waveguide solution can be implemented at lower cost and less weight. However, the non-mechanical beamsteering waveguide and particularly the LCWG has been found to have a number of limitations, which may include, but are not limited to, steering a very narrow band of wavelengths about a center wavelength, limited steering range and limited speed. Furthermore each material system e.g., substrates, coatings and liquid crystals, and voltage settings to steer the laser beam are unique to each center wavelength. Therefore to accommodate different wavelengths requires different LCWG devices and significant investment in materials, manufacturing, set-up and calibration etc. to design and field each device.

Optical imaging systems, passive or active, use movable optical elements to image a scene. In various conventional approaches, a single optic is positioned by a gimbal system to stabilize the line-of-sight of the optical receiver. However, with these typical systems, the cost and weight of the associated system also significantly increases and the line of sight stability is low.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an approach to small angle optical beam steering using a Micro-Electro-Mechanical System (MEMS) Micro-Mirror Array (MMA) that minimizes diffraction for a specified steering angle. Generally speaking, this is accomplished with a MEMS MMA. that exhibits a "piston" capability to translate individual mirrors in addition to the tip and tilt capabilities. Adjacent mirrors can be tipped/tilted to the specified steering angle and then translated by a requisite amount to approximate a continuous surface. For a specified steering angle, the MEMS MMA is partitioned into one or more sections with each section including the maximum number of mirrors that can be grouped together and actuated to approximate a continuous surface given a maximum translation z. As a result, the only edge discontinuities exist between adjacent sections thereby minimizing diffraction effects for a given steering angle, In a transmit system, this reduces wavefront distortion of the transmitted beam. In a receive system, this reduces distortion thereby increase imaging resolution.

In most cases, the requirement to approximate a continuous surface across each section limits the steering range of the MEMS MMA to small angles. For example, a MEMS MMA that might support +/−15° tip or tilt of each mirror, may be limited to a steering range of less than +/−5° tip or tilt to approximate a continuous surface with two or more mirrors. This is greatly dependent upon the maximum translation z achievable in a given implementation of the MEMS MMA. In most applications, loss of steering range would make this approach impractical. However, in certain applications small angle steering is sufficient, For example, space based systems that operate at long ranges may require only a few degrees of steering to transmit the beam. In addition, small angle steering may be used on the receiver side to, for example, stabilize the line of sight for a system operating in a vibrating environment.

In an embodiment, each mirror rotates about X and Y orthogonal axes, respectively, and translates along a Z axis orthogonal the Xi plane to tip, tilt and piston. In an implementation of such an embodiment, each mirror is supported at three vertices of an equilateral triangle. Lines defined by three different pairs of vertices provide three axes at 60 degrees to one another in the XY plane. Each mirror pivots about each of the axes to produce tilt, tip and piston in the XYZ space. Other implementations may provide tip, tilt and piston in the XYZ space.

In different embodiments, the partitioning of the MEMS MMA into sections may be "fixed" or "adapted". In a fixed implementation, the number of sections is determined to satisfy a maximum steering angle specified for the system or vice-versa. The mirrors are actuated within each section to approximate a continuous surface at a specified steering angle. This approach is sub-optimal in the sense that diffraction is not minimized for the smallest angles but does not require updating the partition of the MMA with updates of the steering angle. In an adaptive implementation, the MEMS MMA is repartitioned for each update of the specified steering angle to select the minimum number of sections (maximum grouping of mirrors) that can approximate a continuous surface at the specified steering angle.

In different embodiments, the MEMS MMA is responsive to command signals to partition itself into a plurality of segments, each segment including a plurality of mirrors to form and independently steer a plurality of optical beams at specified steering angles. For each segment, the controller determines the maximum number of mirrors that may be grouped together in sections as limited by the maximum translation z to form a continuous surface at specified tip and tilt angles to provide the specified steering angle. In an embodiment, the mirrors in different segments reflect light at different wavelengths such that the plurality of optical beams provide a diversity of wavelengths. This may be accomplished by using a plurality of sources at different wavelengths, optical coatings at different wavelengths or a combination thereof.

In different embodiments, the system further utilizes the piston capability of the MEMS MMA to perform additional optical functions to shape the beam. For example, piston capability can be used to perform one or more of the following including adjusting a size, divergence or intensity profile of the beam, producing deviations in the wavefront of the beam to compensate for atmospheric distortion or to adjust the phase for path length variations across the beam and maintain a zero phase difference across the beam, or adding optical power to focus or defocus the beam.

These and other features and advantages of the invention will be apparent to those skilled in the art from the following detailed description of preferred embodiments, taken together with the accompanying drawings, in which:

DETAILED DESCRIPTION OF THE INVENTION

To overcome limitations of using a waveguide to perform beam steering, another approach is to use a Micro-Electro-Mechanical System (MEMS) Micro-Mirror Array (MMA) to steer a beam of optical radiation. MEMS MMA beam steering may be used in an active system to steer the beam provided by an illumination source or stabilize line of sight for a receiver, passive or active. The MEMS MMA comprises an array of independently and continuously tunable mirrors that can tip and tilt to re-direct the beam. The MEMS MMA typically exhibits a larger steering range and faster speeds than the LCWG. For many applications, the ability to steer the beam quickly over larger angles allows the MEMS MMA to prosecute a larger Field-of-Regard (FOR) than the waveguide approach. Furthermore, the MEMS MMA can be implement for different wavelengths without changing the material system or the beam steering settings. Different wavelengths can be realized by using a plurality of sources at different wavelengths, optical coatings at different wavelengths or a combination thereof.

Figure 1:
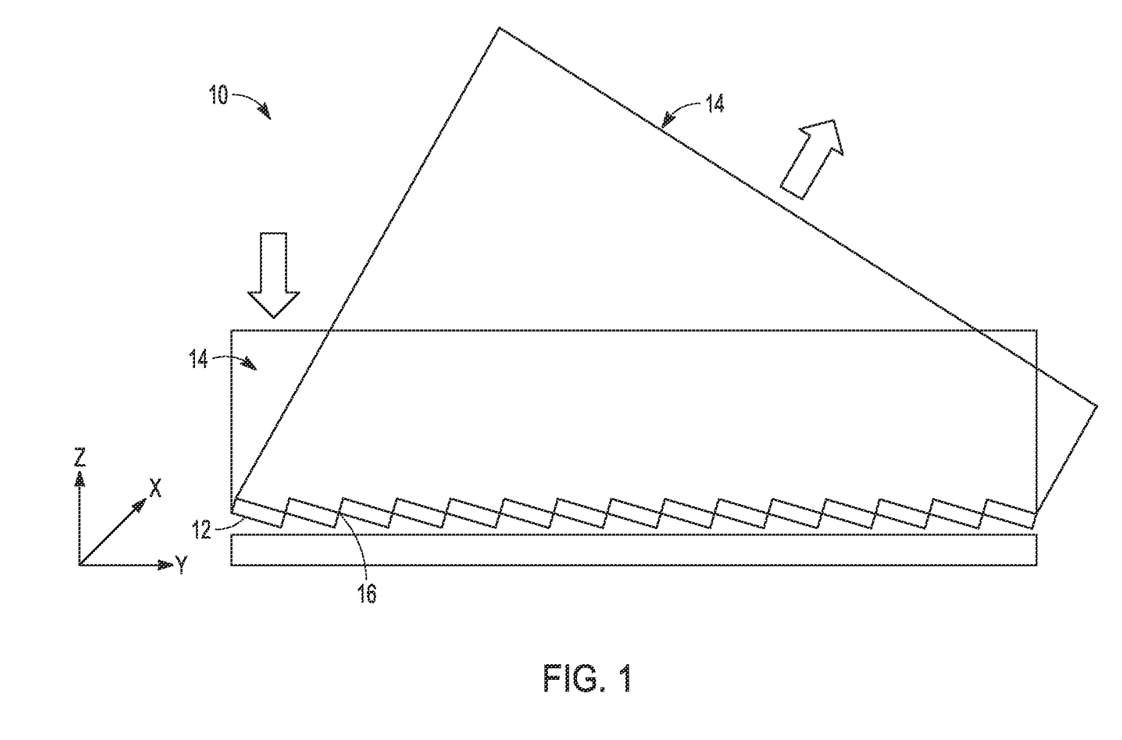
FIG. 1 illustrates the use of a MEMS MMA to perform optical beam steering.

As shown in FIG. 1, a MEM MMA 10 includes an array or mirrors 12 that can tip and tilt about the X and Y axes, respectively. A beam 14 of optical radiation is incident normal to the surface of the MEMS MMA. To steer beam 14, all of the mirrors are tipped and/or tilt at the same angle to re-direct the beam 14. One drawback to the MEMS MMA is the diffraction created at the edge discontinuities 16 between adjacent minors 12. The diffracted light increase the spot size of the beam, reduces power in the desired spot size and degrades overall performance of the optical system.

The present invention provides an approach to small angle optical beam steering using a MEMS MMA that reduces and possibly minimizes diffraction for a specified steering angle. Generally speaking, this is accomplished with a MEMS MMA that exhibits a "piston" capability to translate individual mirrors in addition to the tip and tilt capabilities. Adjacent mirrors can be tipped/tilt to the specified steering angle and then translated by requisite amounts to approximate a continuous surface. For a specified steering angle, the MEMS MMA is partitioned into one or more sections with each section including the maximum number of mirrors that can be grouped together and actuated to approximate a continuous surface given a maximum translation z. As a result, the only edge discontinuities exist between adjacent sections thereby minimizing diffraction effects for a given steering angle.

Figure 2A:
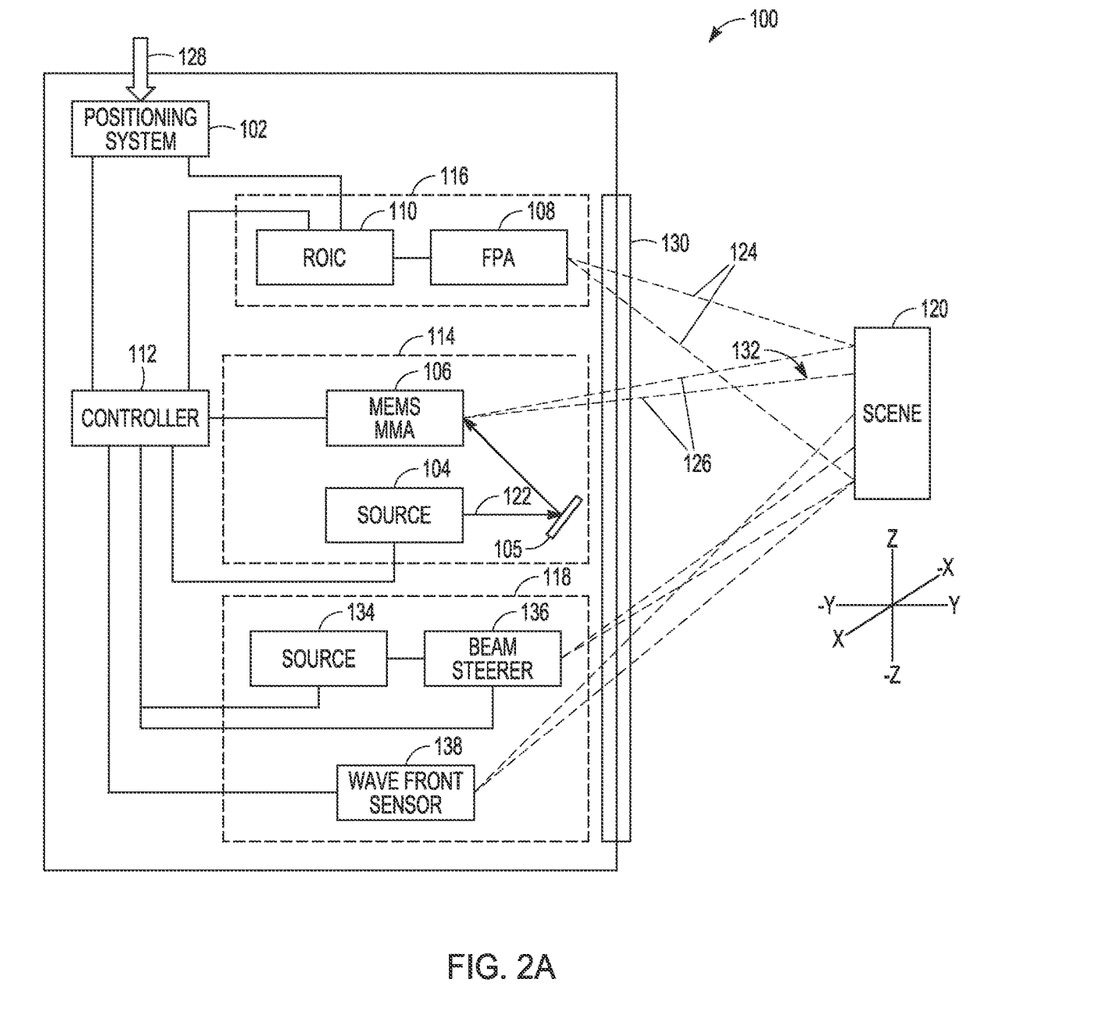
FIGS. 2A and 2B, are simplified block diagrams illustrating the use of a MEMS MMA to perform small angle optical beam steering in transmission and reception, respectively.

FIG. 2A is a block diagram of an example active imaging system 100 according to certain aspects and examples. Active imaging system 100 may, for example, be used for space based other long-range applications in which small angle steering is prevalent. Among other components, the active imaging system 100 may include a positioning system 102, an optical source 104, a Micro-Electro-Mechanical System (MEMS) Micro-Mirror Array (MMA) 106 having tip, tilt and piston capabilities, and an optical receiver 108. As illustrated, in certain examples the active imaging system 100 may further include a Read-Out Integrated Circuit (ROTC) 110 and a controller 112. In certain examples, components of the active imaging system 100 may be separated into one or more subsystems, such as the illustrated scanning subsystem 114, the illustrated detection subsystem 116 and the illustrated wavefront sense and correction subsystem 118. Each of the subsystems 114, 116, 118 may include various additional components in optical and/or electrical communication, as further discussed herein.

It is to be appreciated that embodiments of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to the example active imaging system 100 illustrated in FIG. 2A, the active imaging system 100 may include a positioning system 102 configured to detect a direction of motion of the imaging system 100 relative to a scene (e.g., scene 120). The positioning system 102 may be coupled to the controller 112 and one or more components of the detection subsystem 116, such as the ROTC 110. In certain examples, the positioning system 102 may include a Global Positioning System (GPS) configured to receive GPS positioning information, such as time and location data 128. The GPS system may in certain embodiments include a GPS transceiver that sends and receives GPS positioning information with one or more GPS satellites. The GPS transceiver derives a three-dimensional position of the imaging system 100 based at least in part on a plurality of GPS position signals, each GPS signal being received from a respective GPS satellite, For instance, the GPS transceiver may convert the position derived from the positioning information to a longitude, latitude, and height relative to an Earth-based model. Based on a series of consecutive position measurements (e.g., longitude, latitude, and height), the positioning system 102 may determine the direction of motion of the imaging 100, relative to the scene.

While illustrated as separate from the controller 112 of the active imaging 100, in certain examples, the positioning system 102 may be combined with one or more other components of the imaging 100, such as the control circuitry 112, For example, the positioning system 102 and other combined components of the active imaging system 100 may include a combination of software-configured elements, control circuitry, signal processing circuitry, application specific integrated circuit, or any combination of various hardware and logic circuitry for performing the various processes discussed herein.

According to various examples, an optical source(s) 104 is in optical communication with MEMS MMA 106 and configured to generate and provide a beam of electromagnetic radiation. In particular, the optical source 104 may generate the beam of electromagnetic radiation at a desired wavelength, such as any wavelength of shortwave infrared (SWIR) radiation. Accordingly, in certain examples the optical source 104 may include an active SWIR laser configured to emit SWIR radiation within a wavelength range of approximately 0.9-1.7 micrometers. However, in other examples the optical source 104 may include any other suitable source of electromagnetic radiation, such as a NIR (near-infrared) laser or a visible light source. In one embodiment, electromagnetic radiation generated by the optical source 104 is coherent, and the system 100 includes one or more collimating optics. In certain embodiments, optical source 104 may emit broadband electromagnetic radiation that spans multiple discrete wavelengths. In other embodiments, different optical sources 104 may emit electromagnetic radiation at different discrete wavelengths, which may either span a specified broadband or may be non-contiguous. The optical source may be continuous wave laser for scene illumination such as visible, 808 nm, 980 nm or 1550 nm.

As illustrated in FIG. 2A, the MEMS MMA 106 is positioned to receive the transmitted beam of electromagnetic radiation from the optical source 104 reflected off a fold mirror 105. For example, the MEMS MMA 106 may receive the transmitted beam of electromagnetic radiation via an optical fiber or free space coupling along a transmit path 122. Responsive to receiving the electromagnetic radiation, the MEMS MMA 106 may be controlled via command signals to direct the electromagnetic radiation generated by the optical source 104 through an optically transparent window 130 to form and scan an optical beam 132 over at least one portion of the scene at a specified steering angle. The MEMS MMA, using its piston capability, may be configured to provide the specified steering angle while reducing or minimizing diffraction effects thereby reducing wavefront distortion of the transmitted optical beam. In particular, the MEMS MMA 106 may scan the electromagnetic radiation over a portion of the scene within a field-of-view of the optical receiver 116. This may include directing the electromagnetic radiation over a section of the scene that is less than the entire filed-of-view of the optical receiver 108, as illustrated in FIG. 2A. Within FIG. 2A, the field-of-view (FOV) of the optical receiver 108 taken at a particular instant is illustrated by the range 124, and the scanned optical radiation is indicated by the range 126. Over time, the optical receiver's FOV will scan a larger field-of-regard (FOR).

In certain examples, the optical path length of optical beam 132 will vary across the spatial extent of the beam due to either a non-uniform thickness of optically transparent window 130, which may be flat, hemispheric, ogive or other shape, or the angle of the beam through the window. This induces curvature to the wavefront. The MEMS MMA 106, and specifically its piston capability, may be configured through calibration to compensate for variations in path length and remove the curvature.

In certain examples, it is desirable to compensate for atmospheric distortion, which varies with time. A source 134 is positioned to emit electromagnetic radiation e.g. SWIR in an optical beam preferably having a "flat-top" intensity profile. Source 134 may be a pulsed laser at 1064 nm. A beam steerer 136 such as a rotating mirror, LCWG or MEMS MMA steers the beam to illuminate scene 120. A wavefront sensor 138 measures the wavefront of the reflected optical beam. Alternate embodiments may combine some or all functions of the imaging and wavefront correction sensor into a single system including the optical source, beam steering and sensor. Controller 112 generates command signals to configure the MEMS MMA, and specifically its piston capability, to compensate for the atmospheric distortion.

Figure 2B:
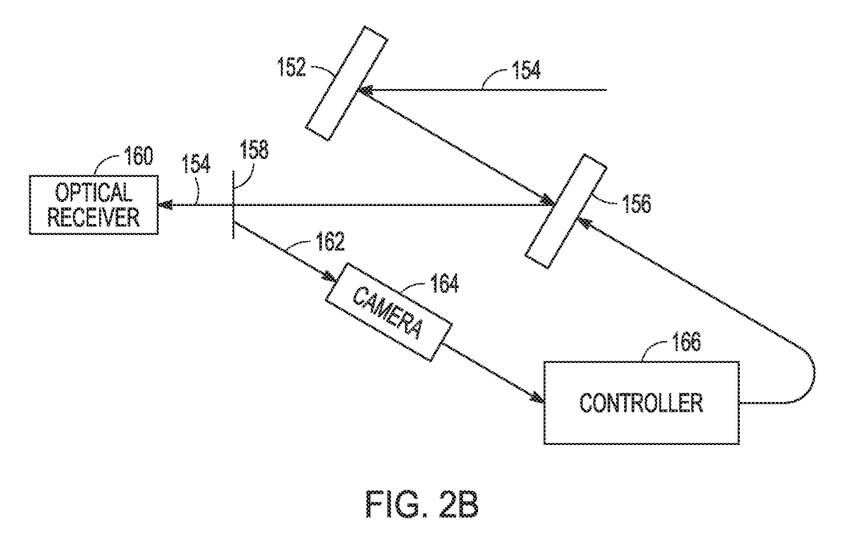

FIG. 2B is a block diagram of an example imaging system 150 according to certain aspects and examples. Imaging system 150 may, for example, be used to provide small angle steering to mitigate platform vibrations. Among other components, the imaging system 150 may include a fold mirror 152 to re-direct an optical beam 154 from a scene onto a MEMS MMA 156, which nominally re-directs optical beam 154 along an optical axis (e.g. the Z axis) through an aperture 158 to an optical receiver 160 such as an FPA. This may be a passive or active imaging system. For example, MEMS MMA 156 could be positioned between FPA 108 and the window 130 to stabilize the line of sight in FIG. 2A. If the system is out of alignment as may occur for platform vibrations, a portion 162 of optical beam 154 will be reflected from the solid portion of the aperture. A camera 164 measures the reflection and a controller 166 determines and issues command signals to the MEMS MMA to adjust the small angle steering angle to correct the position and maintain system alignment. The MEMS MMA will be partitioned into the minimum number of sections (maximum grouping of mirrors) to provide the steering angle and reduce or minimize diffraction effects for the given steering angle.

Figure 3A:
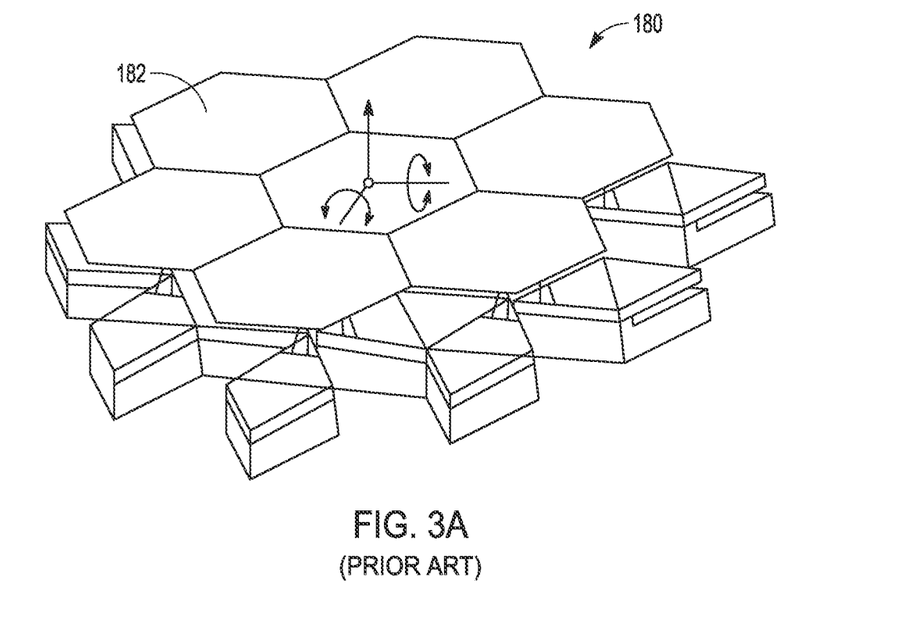
FIGS. 3A-3B are illustrations of an embodiment of a Tip/Tilt/Piston ("TTP") MEMS MMA and a single mirror actuated to tip, tilt and piston (translate)
Figure 3B:
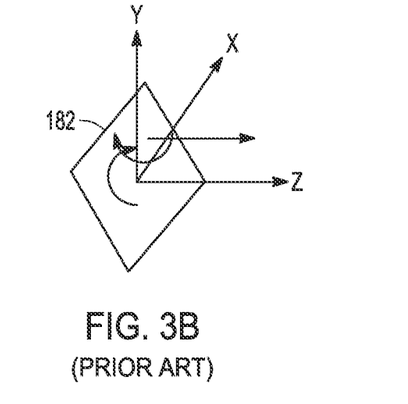

As best shown in FIGS. 3A-3B, a Micro-Electro-Mechanical System (MEMS) Micro-Mirror Array (MMA) 180 comprises a plurality of independently and continuously controllable mirrors 182 arranged in a 2D array in the XV plane to form and steer the optical beam(s). Each mirror is capable of at least "Tip" (rotation about an X-axis) and "Tilt" (rotation about a Y-axis). In preferred embodiments, each mirror is also capable of "Piston" (translation along a Z-axis, perpendicular to the XY plane) where the X; Y and Z are orthogonal axes in a three-dimensional space. The Piston capability can be used generically speaking to "shape" the beam(s) that are reflected off of the MEMS MMA.

More specifically, for small angle beam steering the Piston capability can be used to provide the requisite translation of mirrors within a section to approximate a continuous surface at a specified steering angle (combined tip and tilt angles). The maximum amount of translation "z" of the mirror to Piston limits the maximum steering angle that can be serviced for a given grouping of mirrors in a section. The greater the number of mirrors, the smaller the maximum steering angle. More specifically, the maximum angle is given by arcsin(z/w) where w is the width of the section e.g. number of mirrors in a given direction multiplied by the width of the mirror. Therefore, for small angles, the MEMS MMA can be partitioned into a small number of sections thereby limiting the number of edge discontinuities, hence the amount of diffraction.

The piston capability can also be used to perform other beam shaping functions such as to focus the beam in size or shape. The Piston capability can also be used to adjust the size, divergence or intensity profile of the beam, produce deviations in the wavefront of the beam to compensate for atmospheric distortions, adjust phase to maintain a zero phase difference across the beam, add optical power to the beam to focus or defocus the beam or to improve the formation and steering of the beam by approximating a continuous surface across the micro-mirrors, which reduces unwanted diffraction to increase power in the f optical beam.

The MEMS MMA is preferably capable of steering an output laser beam over a range of at least −15°×+15° in tip and tilt (30°×30° and steering range) and +/−15 microns (at least one-half wavelength in either direction) piston at a rate of at least 1 KHz (<1 millisecond). The independently controllable mirrors can be adaptively segmented to form any number of optical beams, adjust the size/power of a given optical beam, generate multi-spectral optical beams and to combine multiple input sources. Further, the MEMS MMA must have a sufficient number of mirrors, mirror size/resolution, fill factor, range of motion, response time, response accuracy and uniformity across the array.

One such MEMS MMA is described in U.S. Pat. No 10,444,492 entitled "Flexure-Based, Tip-Tilt-Piston Actuation Micro-Array", which is hereby incorporated by reference. As shown in FIGS. 1-3 of the '492 patent this MEMS MMA uses flexures to support each mirror at three fulcrum points (or vertices) of an equilateral triangle. The three different pairs of fulcrum points define three axes at 60 degrees to one another in the XY plane. Each mirror pivots about each axis to produce tip, tilt and piston in the XYZ space. This MEMS MMA is currently being commercialized by Bright Silicon technologies for "digitally controlling light."

Figure 4A:
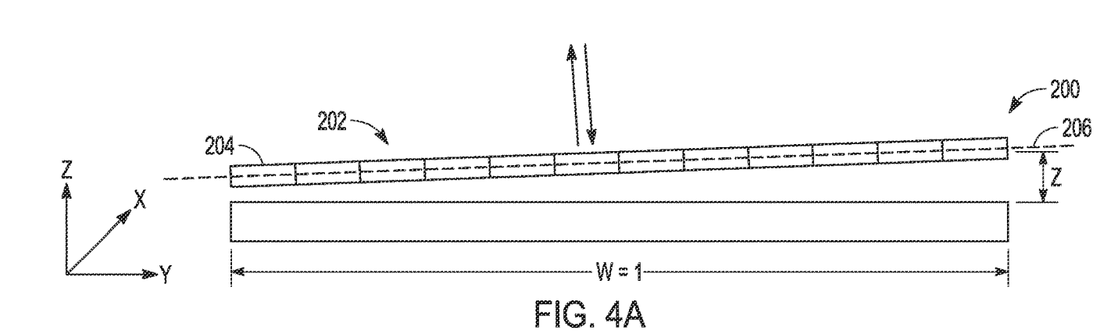
FIGS. 4A through 4C illustrate a MEMS MMA that is partitioned into a minimum number N of sections to provide a specified beam steering angle and configured via tip, tilt and piston to approximate a continuous surface at the specified beam steering angle for each segment.
Figure 4B:
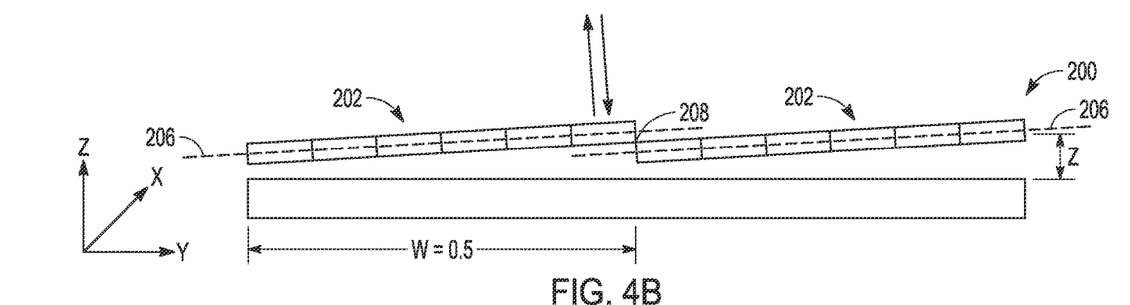
Figure 4C:
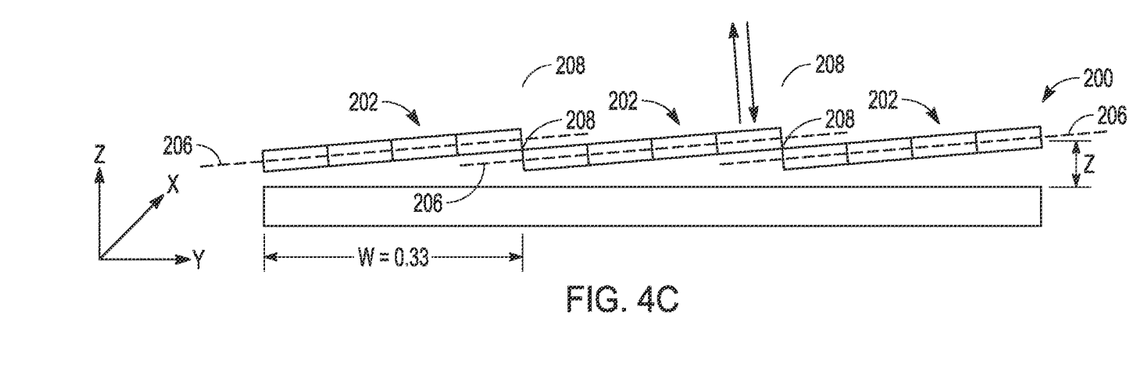

As shown in FIGS. 4A-4C, a MEMS MMA 200 is partitioned into one or more sections 202 with each section including a plurality of mirrors 204 exhibiting tip, tilt and piston capabilities. To provide a specified steering angle, all of the mirrors within a section and all of the mirrors between different sections are tipped and tilted about the X and Y axes, respectively, at the same tip and tilt angles. Each mirror within a section is pistoned (translated along the Z axis) by a requisite amount such that the mirrors approximate a continuous surface 206 across the section. The maximum angle, tip or tilt, that can be achieved is given by arcsin(z/w) where z is the maximum piston stroke (translation along z) and w is the width of the section (e.g. for tip, the number of mirrors and width of each mirror along the Y axis). For larger values of w (more mirrors grouped into a section), the maximum tilt angle, hence steering angle is smaller. Therefore, for small steering angles the number of sections N can be reduced to minimize diffraction off of edge discontinuities 208 between sections for a specified steering angle.

Figure 5:
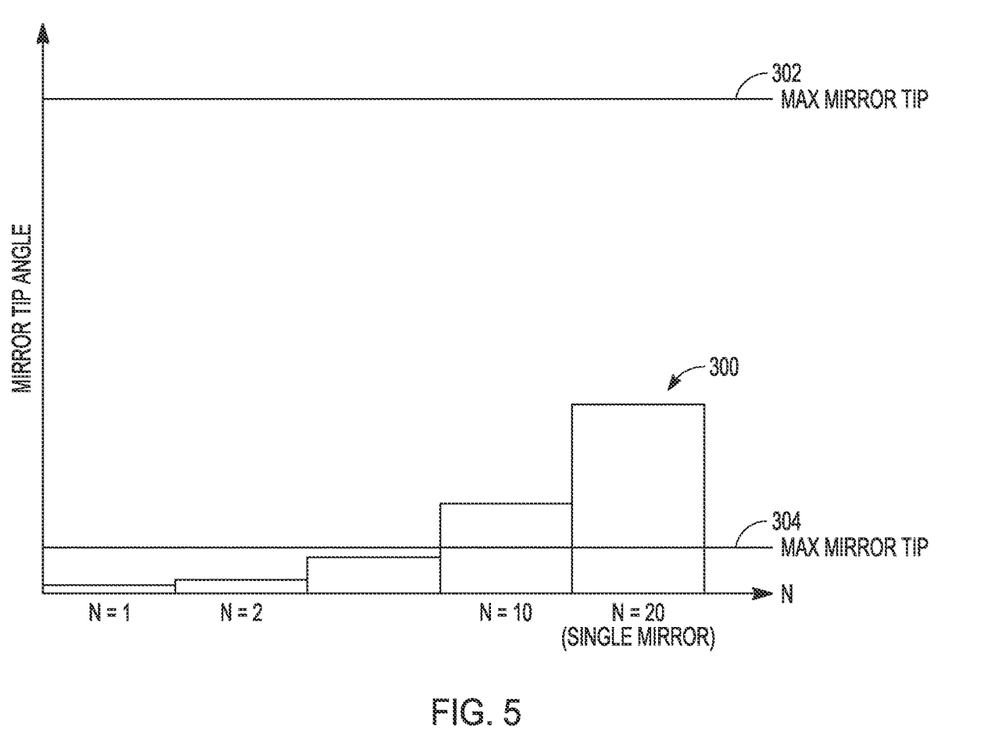
FIG. 5 is a plot of mirror tip angle versus the number of sections.

FIG. 5 is a plot of mirror tip angle 300 for which a continuous surface across a section can be formed versus the number of sections (grouping of mirrors) along an axis of the MEMS MMA, In this example, the MEMS MMA includes 20 mirrors (1 mm in width) positioned along the Y axis to tip about the X axis. Each mirror can tip and tilt about the X and Y axes, respectively, and piston +/−35 microns along the Z axes.

TABLE 1

| | | | | | | | |
|---|---|---|---|---|---|---|---|
| w | Section width | 20 | 10 | 5 | 4 | 2 | 1 |
| N | # Sections | 1 | 2 | 4 | 5 | 10 | 20 |
| z | Max Piston (mm) | 0.07 | 0.07 | 0.07 | 0.07 | 0.07 | 0.07 |
| Tip | Arcsin(z/w) (deg) | 0.201 | 0.401 | 0.802 | 1.003 | 2.006 | 4.014 |
| | Diffraction spot size (deg) | 0.003 | 0.007 | 0.014 | 0.917 | 0.0035 | 0.0070 |

As expected, as the section width increases, the maximum tip decreases but the diffraction spot size also decreases indicating less diffraction due to fewer edge discontinuities. For this specific MEMS MMA configuration e.g. number of mirrors, size of the mirror, max piston etc. the serviceable angular range to gain benefits from approximating a continuous surface across multiple mirrors that form a section is quite small, 2 degrees or less. Although shown in Table 1 the entry for a section including only a single mirror is a degenerate case. For a single mirror, the limiting factor is the maximum tip (or tilt) angle 302 of the mirror itself. In this example, that is 15 degrees, not 4 degrees as suggested by the geometry. As such, in this example, which is exemplary of typical MMA configurations, considerable steering angle range may be sacrificed in order to reduce diffraction.

In light of this, configuring the MEMS MMA to approximate continuous surfaces across surfaces may not be practical for many typical applications in which a large steering range is required. This approach may be limited to applications such as the aforementioned long range steering as found in space-based systems or to compensate for small angular adjustments such as found on imaging platforms to compensate for vibration. A hybrid approach in which the MEMS MMA is configured as shown in FIG. 1 i.e. 1 mirror per section to service large steering angles and is configured as shown in FIGS. 4A-4C i.e. multiple mirrors per section to service small steering angles may be viable, particularly where large angle steering is relatively infrequent.

In a different MEMS MMA configuration in which, for example, the individual mirror tip (or tilt) angle 304 is much less and the maximum piston z is larger, that individual mirror tip may constrain the maximum angle at which a continuous surface can be formed. In this circumstance, the MEMS MMA would be at most partitioned into the number of sections that would support that maximum angle. To form more and smaller sections would simply sacrifice diffraction losses for no reason.

In different embodiments, the partitioning of the MEMS MMA into sections may be "fixed" or "adapted". In a fixed implementation, the number of sections is determined to satisfy a maximum steering angle specified for the system or vice-versa. The mirrors are actuated within each section to approximate a continuous surface at a specified steering angle. This approach is sub-optimal in the sense that diffraction is not minimized for the smallest angles but does not require updating the partition of the MMA with updates of the steering angle. In an adaptive implementation, the MEMS MMA is repartitioned for each update of the specified steering angle to select the minimum number of sections (maximum grouping of mirrors) that can approximate a continuous surface at the specified steering angle.

In addition to providing the requisite translations of the mirrors to approximate the continuous surface within a section to reduce diffraction, the MEMS MMA's piston capability can be simultaneously used to perform other useful beam shaping optical functions such as, but not limited to, (a) adjusting a size, divergence or intensity profile of the beam, (b) producing deviations in the wavefront of the beam to compensate for atmospheric distortion, (c) producing deviations in the wavefront of the beam to adjust the phase for path length variations across the beam and maintain a zero phase difference across the beam, (d) adding optical power to focus or defocus the beam or combinations thereof. These are important optical functions that are not supported by other beamsteering devices such as gimballed mirrors, LCWGs or MEMS MMAs that do not have piston capability.

Figure 6:
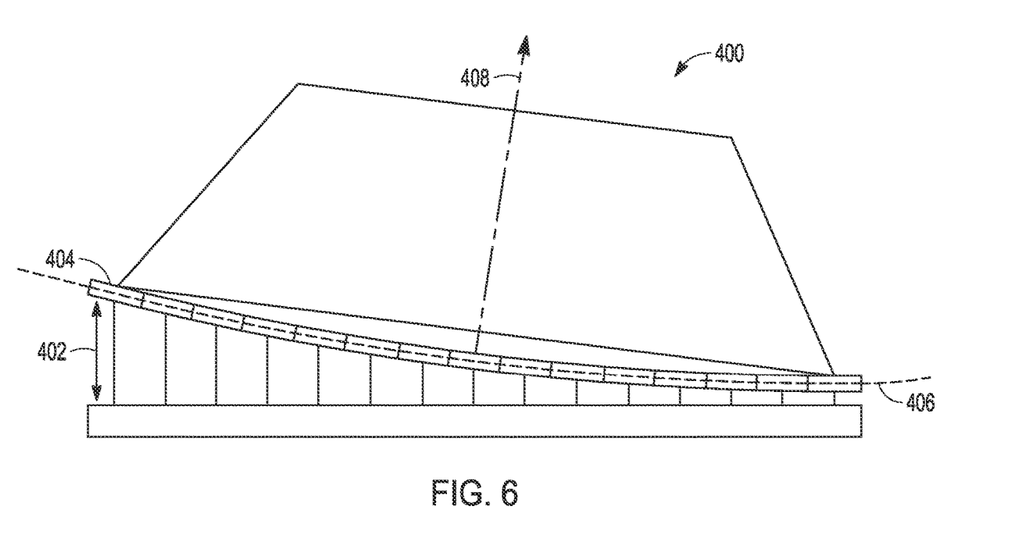
FIG. 6 is an illustration of using the Piston capability to add optical power to the continuous surface.

As illustrated in FIG. 6 responsive to command signals from the controller a MEMS MMA 400 tips, tilts and pistons (translates 402) mirrors 404 to approximate a continuous mirror surface 406 at a given steering angle to re-direct an optical beam 408. Each mirror can suitably translate at least ½ wavelength and typically several wavelengths in either direction to form the continuous mirror surface 406. The edge discontinuities 610 and loss of power are minimized. The MEMS MMA piston capability is also used to focus the optical beam 408. A small amount of focusing can be achieved solely by use of the piston capability. As shown, a large amount of focusing can be achieved by using tip, tilt and piston to shape the entire continuous mirror surface 406 to include a measure of optical power. In the later case, a measure of additional tip/tilt is imposed on the common base tip/tilt for all the mirrors.

Figure 7:
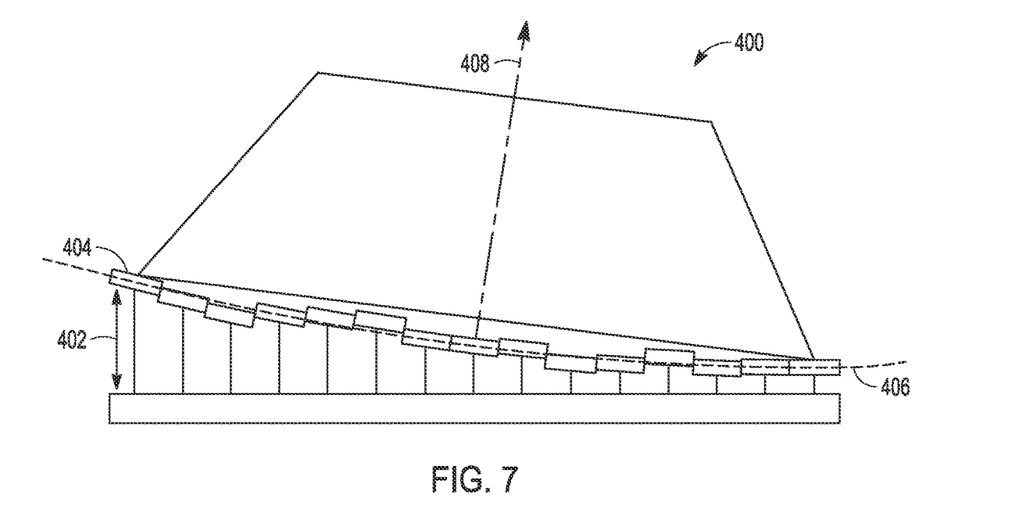
FIG. 7 is an illustration of using the Piston capability to make small deviations from the continuous surface to compensate for atmospheric distortion.

As illustrated in FIG. 7 responsive to command signals from the controller MEMS MMA 404 can adjust the piston 402 of mirrors 402 to induce small deviations from continuous mirror surface 406. This can be done to compensate for path length variation of the optical beam through, for example, an optically transparent window, to correct for atmospheric distortion or both. Adjustments for path length variation can be calibrated offline and stored in a lookup table (LUT) as a function of scan angle. Adjustments for atmospheric distortion are done in real-time during operation of the active imaging system. Referring to FIG. 1, source 134 emits electromagnetic energy in a similar band to illumination e.g., SWIR and beam steerer scans the optical beam onto scene 120. The optical beam preferably has a flat-top across the cross-section of the beam. Wavefront sensor 138 measures the wavefront of the reflected beam to determine the effects of atmospheric distortion. Controller 112 computes the requisite piston adjustments required to correct the wavefront and provides them as command signals to the MEMS MMA. In high quality, high performing active imaging systems, the ability to accurately remove the effects of path length variation and atmospheric distortion is critical to achieving useful imagery of the scene, and important features identified within the scene. The small deviations from the continuous surface will create small edge discontinuous and an additional measure of diffraction. However, the benefits of compensating for path length variations or atmospheric distortions far outweigh the small amount of additional diffraction.

In addition to partitioning the MEMS MMA into one or more sections to reduce diffraction for small angle steering of an optical beam, the MEMS MMA may be partitioned at a higher level into "segments", each segment partitioned into one or more "sections" to form and independently steer a plurality of optical beams of the same or different wavelength composition with reduced diffractions. The segments do not need to be equally sized, can be any portion of the array and can be changed on the fly in number, size or location. A single broadband source may be positioned to emit optical radiation that spans all of the wavelengths onto the entire MEMS MMA. It may more efficient to use multiple narrowband sources positioned to emit optical radiation at the wavelength corresponding to a. respective segment. All of the mirrors may be provided with a broadband reflective coating or a narrowband reflective coating at a particular wavelength. Or the mirrors in each of the segments may be provided with narrowband reflective coatings at different wavelengths.

Figure 8A:
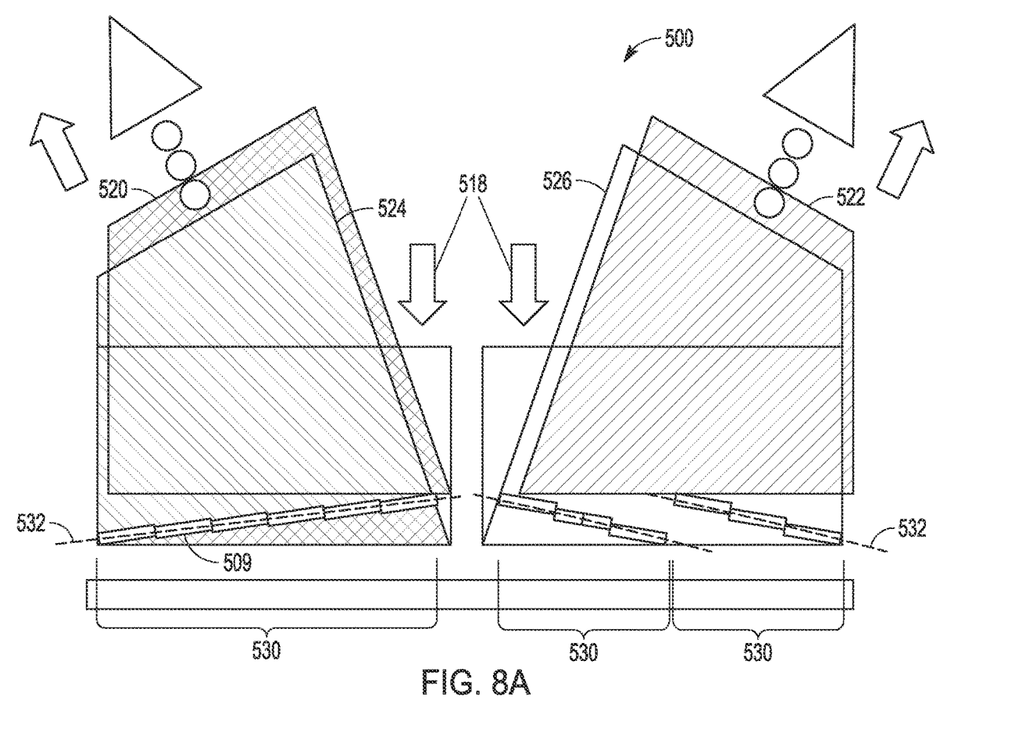
FIGS. 8A and 8B are illustrations of partitioning the MEMS MMA into multiple segments to form and steer multiple optical beams in which each segment is further partitioned into one or more sections in which the minors are actuated to approximate a continuous surface to provide a specified beam steering angle.
Figure 8B:
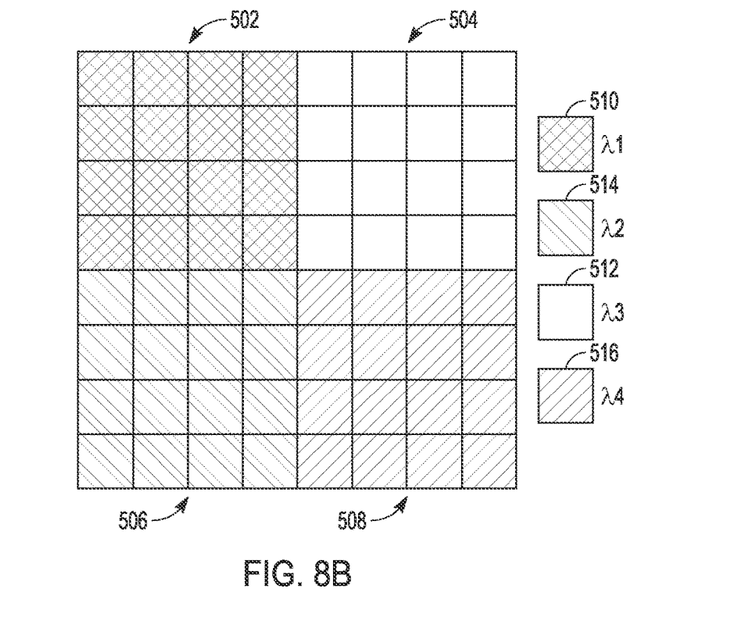

As illustrated in FIGS. 8A-8B, responsive to command signals from the controller, a MEMS MMA 500 is partitioned into four segments 502, 504, 506 and 508 each including a plurality of mirrors 509 illuminated by optical radiation 518. The mirrors in the different sections are provided with reflective coatings 510, 512, 514 and 516 at different wavelengths. In response to command signals, the MEMS MMA tips/tilts/pistons the mirrors in each segment to independent form and scan optical beams 520, 522, 524 and 526 over different portions of scene. Within each segment, the controller generates command signals to further partition the segment into one or more sections 530 of mirrors 509 to approximate a continuous surface(s) 532 at the specified steering angle to minimize diffraction for each of the optical beams.

Additional piston actuation may be included to compensate for path length variation and/or to correct for atmospheric distortion in some or all of the optical beams at the different wavelengths. In response to command signals, the MEMS MMA may form and scan all of the optical beams over the first portion of the scene to provide multi-spectral illumination. Alternately, the MEMS MMA may scan one or more of the optical beams over the first portion of the scene while scanning one or more of the optical beams at different wavelengths over a different portion of the scene e.g. features in previously scanned regions of the scene. In addition, one or more segments at a given wavelength may be partitioned into multiple sub-segments thereby generate a plurality of independently scanned optical beams at the given wavelength.

Figure 9:
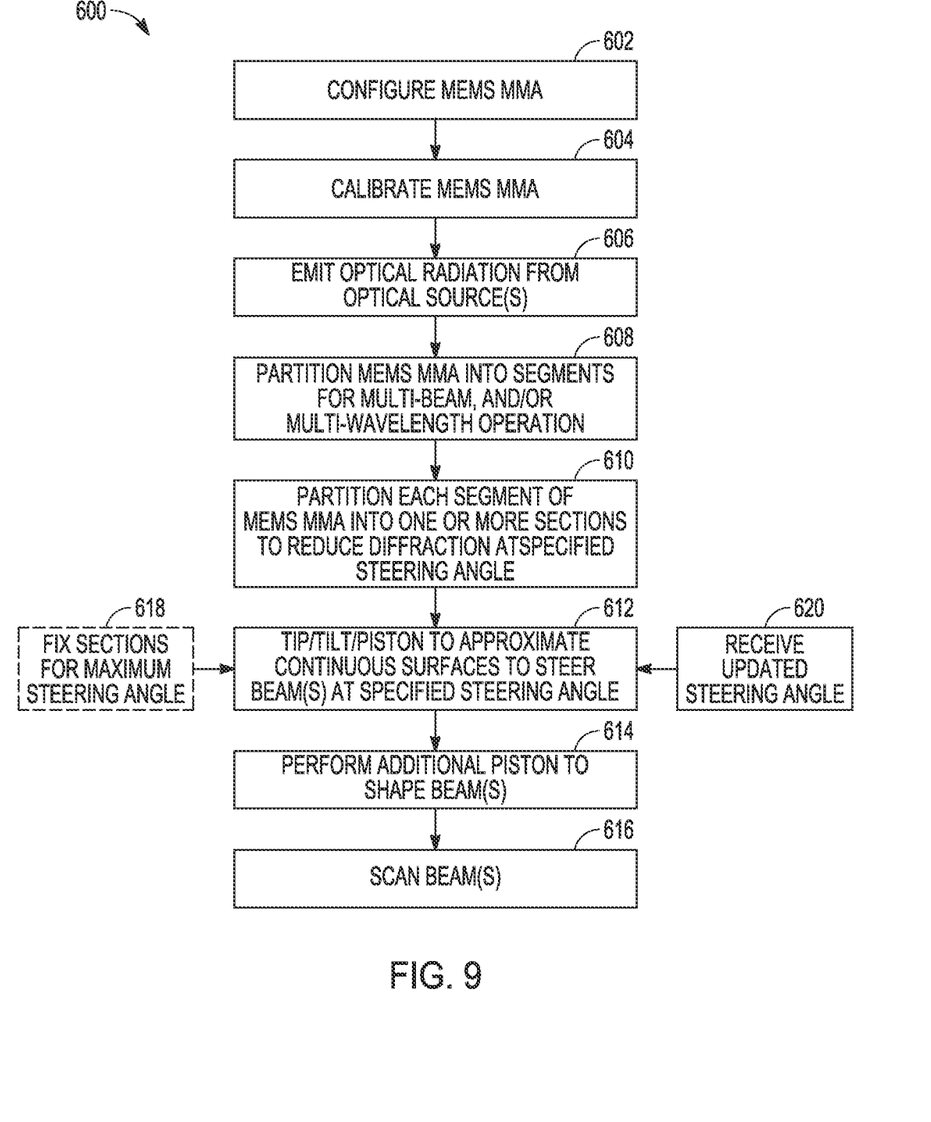
FIG. 9 is an example process flow according to aspects of the invention to provide small angle beam steering while minimizing diffraction.

As described above with reference to FIGS. 1-8 several embodiments perform processes that improve known schemes for small angle beam steering. In some embodiments, these processes are executing by an optical beam steering system, such as the systems described above with reference to at least FIGS. 2A and 2B. One example of such a process 600 is illustrated in FIG. 9.

In act 602 the process 600 may include, configuring the MEMS MMA to, for example, provide different sections of the MMA with different reflective coatings for independent multi-spectral operation or the same broadband coating to produce each optical beam with multiple spectral components.

In act 604 the process 600 may include calibrating the MEMS MMA to determine the minimum number of sections N for a specified steering angle and the command signals to tip/tilt/piston the mirrors to achieve specific steering angles for each section configuration. The calibration may further include the command signals to shape a particular optical beam to provide, for example, focus. For each of these the command signals to tip/tilt/piston each mirror can be stored in different LUTs.

In act 606, the process 600 may include emitting optical radiation from the optical source(s) along the transmit path(s). A single narrowband or broadband optical source may illuminate the entire MEMS MMA. Multiple sources may illuminate different sections of the MEMS MMA and be combined into a single beam. Multiple narrowband sources at different wavelengths may illuminate different sections of the MEMS MMA for independent multi-spectral scanning.

In act 608, the process 600 may partition the MEMS MMA for multi-segment, multi-spectral or beam combined operation.

In act 610, the process 600 may partition each segment of the MEMS MMA into one or more sections as previously determined to reduce diffraction at the specified steering angle for that segment.

In act 612, for each segment, the process 600 tips, tilts and pistons to approximate continuous surfaces in one or more surfaces to steer the optical beam at the specified steering angle.

In act 614, for each segment r beam), the process 600 may perform additional Piston (as well as tip and tilt possibly) to further shape beam. Beam "shaping" may include for example, focusing the beam or providing deviations of the wavefront to compensate for path length variation and/or atmospheric distortion.

In act 616, the process 600 scans the optical beam(s) over at least a first area of the scene. Act 616 may further include scanning additional optical beams to revisit previously scanned portions or scanning additional optical beams in parallel over different areas of the scene.

In act 618, the process 600 may fix the number of sections for each segment to service a maximum steering angle. Thereafter, the controller issues commands to tip/tilt/piston the mirrors based on the fixed sections to service subsequent updates received in act 620 to the steering angle. Alternately, in act 612 the controller can determine the optimum number of sections for each update of the steering angle, re-partition each segment based on the updated number of sections and issue command signals to tip, tilt and piston the mirrors within each section based on the updated partitioning.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A small angle beam steerer, comprising:
a Micro-Electro-Mechanical System (MEMS) Micro-Mirror Array (MMA) positioned to receive an optical beam, said MEMS MMA comprising a plurality of independently and continuously controllable rigid mirrors responsive to command signals to tip, tilt and piston each mirror in a three-dimensional space, wherein the maximum translation of each said mirror to piston is z; and
a controller responsive to a specified steering angle configured to determine a maximum number of minors that may be grouped together in sections as limited by the maximum translation z to form a continuous surface at specified tip and tilt angles to provide the specified steering angle and to issue command signals to partition the MEMS MMA into the sections and to tip and tilt the mirrors to the same specified tip and tilt angles within and between sections and to translate each mirrors in each section by a requisite amount such that the plurality of mirrors in each section approximate a continuous mirror surface at the same specified tip and tilt angles with edge discontinuities existing only between adjacent sections to steer the optical beam at a specified steering angle.

2. The imaging system of claim 1, wherein each said mirror rotates about X and Y orthogonal axes, respectively, and translates along a Z axis orthogonal the XY plane to tip, tilt and piston.

3. The imaging system of claim 2, wherein each said mirror is supported at three vertices of an equilateral triangle, wherein lines defined by three different pairs of said vertices provide three axes at 60 degrees to one another in the XY plane, wherein each said mirror pivots about each said axes to produce tilt, tip and piston in the XYZ space.

4. The imaging system of claim 2, wherein the controller determines a minimum number of sections N along the Y axis for the specified tip angle and a minimum number of sections M along the X axis for the specified tilt angle.

5. The imaging system of claim 3, wherein a maximum tip or tilt angle is given by arcsin(z/w) where w is a width of the mirror in the X or Y direction multiplied by the number of mirrors in a section along the X or Y direction.

6. The imaging system of claim 3, wherein maximum tip and tilt angles for different integer values of N and M are stored in a look-up table (LUT), wherein the controller accesses the LUT to select the minimum integer values for N and M that exceed the specified tip and tilt angles to provide the specified steering angle.

7. The imaging system of claim 1, wherein the controller determines the maximum number of mirrors that may be grouped together in sections to approximate the continuous surface for specified maximum tip and tilt angles and fixes the partition of the MEMS MMA to that number of sections, wherein the controller tips, tilts and pistons the mirrors for all specified tip and tilt angles less than the specified maximum tip and tilt angles.

8. The imaging system of claim 1, wherein for each update of the specified steering angle the controller determines specified tip and tilt angles, updates the maximum number of mirrors that may be grouped together sections as limited by the maximum translation z to form a continuous surface at specified tip and tilt angles, updates the partition of the MEMS MMA, and tip, tilts and translates the mirrors to approximate the continuous surface at the specified tip and tilt angles to minimize edge discontinuities for the specified steering angle.

9. The imaging system of claim 7, wherein max tip and tilt angles for different integer values of N and M are stored in a look-up table (LUT), wherein the controller accesses the LUT to select the minimum integer values for N and M that exceed the specified tip and tilt angles to provide the specified steering angle.

10. The imaging system of claim 1, wherein the MEMS MMA is responsive to command signals to partition itself into a plurality of segments, each segment including a plurality of mirrors to form and independently steer a plurality of optical beams at specified steering angles, wherein the controller determines the maximum number of mirrors that may be grouped together in sections as limited by the maximum translation z for each said segment to form a continuous surface at specified tip and tilt angles to provide the specified steering angle.

11. The imaging system of claim 10, wherein the mirrors in each segment reflect light at different wavelengths such that the plurality of optical beams comprise a plurality of different wavelengths.

12. The imaging system of claim 1, wherein the mirrors of the MEMS MMA tip, tilt and piston, wherein the mirrors are responsive to command signals to translate to shape the beam to perform one or more of the following:
    adjust a size, divergence or intensity profile of the beam;
    produce deviations in the wavefront of the beam to compensate for atmospheric distortion;
    produce deviations in the wavefront of the beam to adjust the phase for path length variations across the beam and maintain a zero phase difference across the beam;
    add optical power to focus or defocus the beam; and
    partition MMA into a number of sections and approximate a continuous surface across the mirrors at the specified tip and tilt within each section.

13. A small angle beam steerer, comprising:
    a Micro-Electro-Mechanical System (MEMS) Micro-Mirror Array (MMA) positioned to receive an optical beam, said MEMS MMA comprising a plurality of independently and continuously controllable rigid mirrors responsive to command signals to partition the MMA into a plurality of segments, each segment including a plurality of mirrors, and to tip, tilt and piston each mirror in a three-dimensional space to form a steer a plurality of optical beams, wherein the maximum translation of each said mirror to piston is z; and
    a controller responsive to specified steering angles for the plurality of segments configured to determine a maximum number of mirrors that may be grouped together in sections as limited by the maximum translation z for each segment to form a continuous surface at specified tip and tilt angles to provide the specified steering angle and to issue command signals to partition each segment of the MEMS MMA into the sections and to tip and tilt the mirrors to the same specified tip and tilt angles within and between and to translate each mirror in each section by a requisite amount such that the plurality of mirrors in each section approximate a continuous mirror surface at the same specified tip and tilt angles with edge discontinuities existing only between adjacent sections to steer the optical beam for each segment at a specified steering angle.

14. The imaging system of claim 13, wherein for each update of the specified steering angle for each segment the controller determines specified tip and tilt angles, updates the maximum number of mirrors that may be grouped together sections as limited by the maximum translation z to form a continuous surface at specified tip and tilt angles, updates the partition of the MEMS MMA, and tip, tilts and translates the mirrors to approximate the continuous surface at the specified tip and tilt angles to minimize edge discontinuities for the specified steering angle for each segment.

15. The imaging system of claim 13, wherein the mirrors in each segment reflect light at different wavelengths such that the plurality of optical beams comprise a plurality of different wavelengths.

16. A small angle beam steerer, comprising:
    a Micro-Electro-Mechanical System (MEMS) Micro-Mirror Array (MMA) positioned to receive an optical beam, said MEMS MMA comprising a plurality of independently and continuously controllable rigid mirrors responsive to command signals to tip and tilt each mirror about X and Y axes, respectively, and piston each mirror along a Z axis, wherein the maximum translation of each said mirror to piston is z; and
    a controller responsive to sequential updates of a specified steering angle configured to determine a maximum number of mirrors that may be grouped together in a minimum number of N and NI sections along the Y and X axes, respectively, as limited by the maximum translation z to form a continuous surface at specified tip and tilt angles to provide the specified steering angle and to issue command signals to partition the MEMS MMA into the sections and to tip and tilt the mirrors to the same specified tip and tilt angles within and between sections and to translate each mirror in each section by a requisite amount such that the plurality of mirrors in each section approximate a continuous mirror surface at the same specified tip and tilt angles with edge discontinuities existing only between adjacent sections to steer the optical beam at a specified steering angle to minimize edge discontinuities for the specified steering angle.

17. The imaging system of claim 16, wherein each said mirror is supported at three vertices of an equilateral triangle, wherein lines defined by three different pairs of said vertices provide three axes at 60 degrees to one another in the XY plane, wherein each said mirror pivots about each said axes to produce tilt, tip and piston in the XYZ space.

18. The imaging system of claim 16, wherein the MEMS MMA is responsive to command signals to partition itself into a plurality of segments, each segment including a plurality of mirrors to form and independently steer a plurality of optical beams at specified steering angles, wherein the controller s determine the maximum number of mirrors that may be grouped together in sections as limited by the maximum translation z for each said segment to form a continuous surface at specified tip and tilt angles to provide the specified steering angle.

19. The imaging system of claim 18, wherein the minors in each segment reflect light at different wavelengths such that the plurality of optical beams comprise a plurality of different wavelengths.

20. The imaging system of claim 18, wherein the mirrors of the MEMS MMA tip, tilt and piston, wherein the mirrors are responsive to command signals to translate to shape the pulsed laser beam to perform one or more of the following:
adjust a size, divergence or intensity profile of the beam;
produce deviations in the wavefront of the beam to compensate for atmospheric distortion;
produce deviations in the wavefront of the beam to adjust the phase for path length variations across the beam and maintain a zero phase difference across the beam;
add optical power to focus or defocus the beam; and
partition MMA into a number of sections and approximate a continuous surface across the mirrors at the specified tip and tilt within each section.

\* \* \* \* \*